(12) United States Patent
Zarnowitz

(10) Patent No.: US 6,438,311 B1
(45) Date of Patent: Aug. 20, 2002

(54) CABLE RETAINER AND CABLE ORGANIZER USING SAME

(75) Inventor: Arthur Zarnowitz, San Jose, CA (US)

(73) Assignee: ONI Systems Corp., San Jose, CA (US)

( * ) Notice: Subject to any disclaimer, the term of this patent is extended or adjusted under 35 U.S.C. 154(b) by 4 days.

(21) Appl. No.: 09/639,511

(22) Filed: Aug. 14, 2000

(51) Int. Cl.⁷ ................................................. G02B 6/00
(52) U.S. Cl. ...................................................... 385/135
(58) Field of Search ................................. 385/135, 134

(56) References Cited

U.S. PATENT DOCUMENTS

| | | | |
|---|---|---|---|
| 5,037,167 A | 8/1991 | Beaty | 385/147 |
| 5,067,678 A | 11/1991 | Henneberger et al. | 248/68.1 |
| 5,402,515 A * | 3/1995 | Vidacovich et al. | 385/135 |
| 5,506,926 A | 4/1996 | Pongracz | 385/135 |
| 5,530,787 A | 6/1996 | Arnett | 385/137 |
| 5,715,348 A | 2/1998 | Falkenberg et al. | 385/135 |
| 5,740,300 A | 4/1998 | Hodge | 385/135 |
| 5,758,002 A * | 5/1998 | Walters | 385/134 |
| 5,758,004 A | 5/1998 | Alarcon et al. | 385/135 |
| 5,802,237 A | 9/1998 | Pulido | 385/135 |
| 5,804,765 A | 9/1998 | Siemon et al. | 174/65 R |
| 5,913,006 A * | 6/1999 | Summach | 385/134 |
| 5,923,807 A | 7/1999 | Wild | 385/135 |
| 5,943,461 A | 8/1999 | Shahid | 385/92 |
| 5,987,207 A | 11/1999 | Hoke | 385/135 |
| 6,014,490 A | 1/2000 | Canning et al. | 385/135 |
| 6,278,829 B1 * | 8/2001 | BuAbbud et al. | 385/135 |

* cited by examiner

Primary Examiner—Brian Sircus
Assistant Examiner—Brian S. Webb
(74) Attorney, Agent, or Firm—Lumen Intellectual Property Services, Inc.

(57) ABSTRACT

A cable retainer for organizing, arranging, and routing electrical and optical cable includes a shaft and first and second retention mechanisms. The first retention mechanism, which includes a stop attached at the top of the shaft and a flexible top tap attached to the back of the shaft, is attached to the shaft for restraining the cables within a top retention region. The second retention mechanism, which includes a lip structure attached to the front of the shaft and a flexible side tab extending along each side to the front of the shaft, is attached to the shaft for restraining the cables within side retention regions. This cable retainer can be employed in a cable organizer.

17 Claims, 5 Drawing Sheets

CABLE RETAINER AND CABLE ORGANIZER USING SAME

FIELD OF THE INVENTION

This invention relates to devices and arrangements for holding various types of cables. In particular, this invention relates to a cable retainer and corresponding organizer for arranging and retaining electrical cables and optical fibers.

BACKGROUND ART

As optical technology matures, an increasing number of devices use optical signals to transmit information. For example, communications equipment uses optical signals to transmit voice and other data over optical fibers between terminals and subscribers. At the same time, many of the active optical components necessary for generating and processing such optical signals require electrical power. Furthermore, not all signal processing circuitry can transition to optics at the present time. Hence, modern telecommunications modules as well as many other circuits tend to be hybrid, combining both electronics and optics.

Hybrid circuits require interconnection with electrical cabling, e.g., copper wires, as well as optical cabling, e.g., optical fibers. Both of these cable types have to be properly routed to the corresponding electrical and optical sub-assemblies or circuits. Electrical and optical sub-assemblies or circuits frequently reside in the same housing or module. When they do, the module has separate receptacles for plugging in the corresponding cables. In some cases, e.g., in large-scale digital communications terminals having a number of modules, many electrical and optical cables have to be plugged into each module.

Electrical and optical cables have different operating parameters and mechanical properties. Hence, managing and routing a large number of them to their destinations, e.g., in a large scale digital communications terminal presents a challenge.

Optical fiber is very sensitive to bending and kinking while electrical cabling, in general, is not. Optical signals traveling through the waveguide constituting the core of the optical fiber experience increasing losses and attenuation with bending. At a certain critical radius of curvature the optical fiber will experience complete signal loss because all light will leak from the core. In addition, optical fiber is brittle and susceptible to breaking even before reaching the critical radius of curvature.

U.S. Pat. No. 5,715,348 to Falkenberg et al. teaches a fiber management system for routing optical fibers having a minimum bend radius. This management system uses fiber trays with fiber guides having finger portions for retaining the optical fiber. At least one of the fingers has a curved portion with a radius selected to ensure that the optical fiber does not bend past its minimum bend radius when routed over the finger. Also, the fiber tray has a curved lip serving the same purpose. Other prior art include optical fiber splice protector, optical fiber coiling clip, optical fiber network saddle and slotted wiring ducts, e.g., as made by Richco, Inc.

Although the fiber management system taught by Falkenberg et al. is suitable for use in conjunction with racks of modules it does not address the problems encountered in organizing and routing large numbers of optical and electrical cabling simultaneously. Specifically, Falkenberg's system is not practical for arranging and routing cables to their plug-in terminals in the individual modules. The other prior art elements suffer from the same limitations.

In addition to the above problems, optical fibers are susceptible to degradation caused by the leaching of plasticizers from PVC of which their jackets are made. It would thus represent an advance in the art to provide a system capable of organizing and routing electrical and optical cables in situations where a large number of cables and high cable densities are involved. Additionally, it would be a further advance if such system were designed to take into account the different operating and mechanical requirements of optical cables and electrical cables.

OBJECTS AND ADVANTAGES

In view of the above, it is an object of the invention to provide a cable retainer which can be used in organizing, arranging and routing electrical and optical cables. In particular, the cable retainer should allow for effectively organizing and routing large numbers of electrical cables, e.g., copper wires, and optical cables, e.g., fiber optic cables.

It is another object of the invention to provide a cable organizer employing the cable retainers of the invention. The cable organizer should enable effective cable management in large-scale telecommunications terminals and the like.

Further objects and advantages will become apparent upon reading the following description of the invention and its preferred embodiments.

SUMMARY OF THE INVENTION

The objects and advantages of the invention are attained by a cable retainer having a shaft with a top, a bottom, a front, a back and sides. The shaft's cross section can be oval. A top retention region extends along the top of the shaft. The top retention region admits one or more cables. A side retention region extends along one of the sides of the shaft. The side retention region admits one or more cables. The cables mounted in the top retention region and in the side retention region can be of one type, such as optical cables, or of different types, such as electrical cables and optical cables (optical fibers).

The cable retainer has a first retention mechanism attached to the shaft for restraining the cables within the top retention region. A second retention mechanism is attached to the shaft for restraining the cables within the side retention region.

The first retention mechanism is made up of a stop attached at the top of the shaft and a flexible top tab attached to the back of the shaft. The retention region thus extends along the top from the back of the shaft to the stop. The top tab is advantageously designed to overarch the stop. In addition, the top table can extend all the way to the front of the shaft.

The second retention mechanism is made up of a lip structure attached to the front of the shaft and a flexible side tab extending along the side to the front of the shaft as well. Advantageously, the lip structure has several flanges or lips attached to the shaft. In one embodiment, the lip structure is made up of a top lip attached to the top and a bottom lip attached to the bottom of the shaft. With or without the bottom lip, the top lip preferably has a laterally extending portion.

It is also advantageous when the side tab constitutes a portion of the shaft, i.e., when the tab is a portion of the side of the shaft. The side tab can be attached to the back of the shaft. In one embodiment the side tab has a tab stop at the front. Advantageously, the tab stop has an actuation feature of the type that can be manually operated to flex the side tab.

In one embodiment the placement of the top and side retention regions is such that there is a partial overlapping between them. In this embodiment the cable or cables mounted in the top retention region limit the range of motion of the cables mounted in the side retention region.

It is preferable that at least a portion, e.g., the portion which comes in contact with the cables, and especially with the optical cables be made of a chemically resistant plastic. In fact, the entire cable retainer can be made of a chemically resistant plastic.

The present invention further provides a cable organizer employing the cable retainers. In one embodiment the cable retainers are mounted on the cable organizer by their backs and in a predetermined pattern. The cable retainers are preferably mounted at a predetermined distance from each other. In a preferred embodiment the distance is selected such that the laterally extending portion of the top lip of a cable retainer adjacent to another cable retainer cooperates with the tab stop of this other cable retainer to restrain the cable with the side retention region of this other cable retainer.

The cable organizer of the invention can additionally feature a tray positioned below the cable retainers, as well as any number of other convenient features aiding the user in arranging, organizing and routing the two types of cables.

The various embodiments of the invention are described in detail in the subsequent detailed description with reference to the drawing figures.

DETAILED DESCRIPTION

Figure 1:
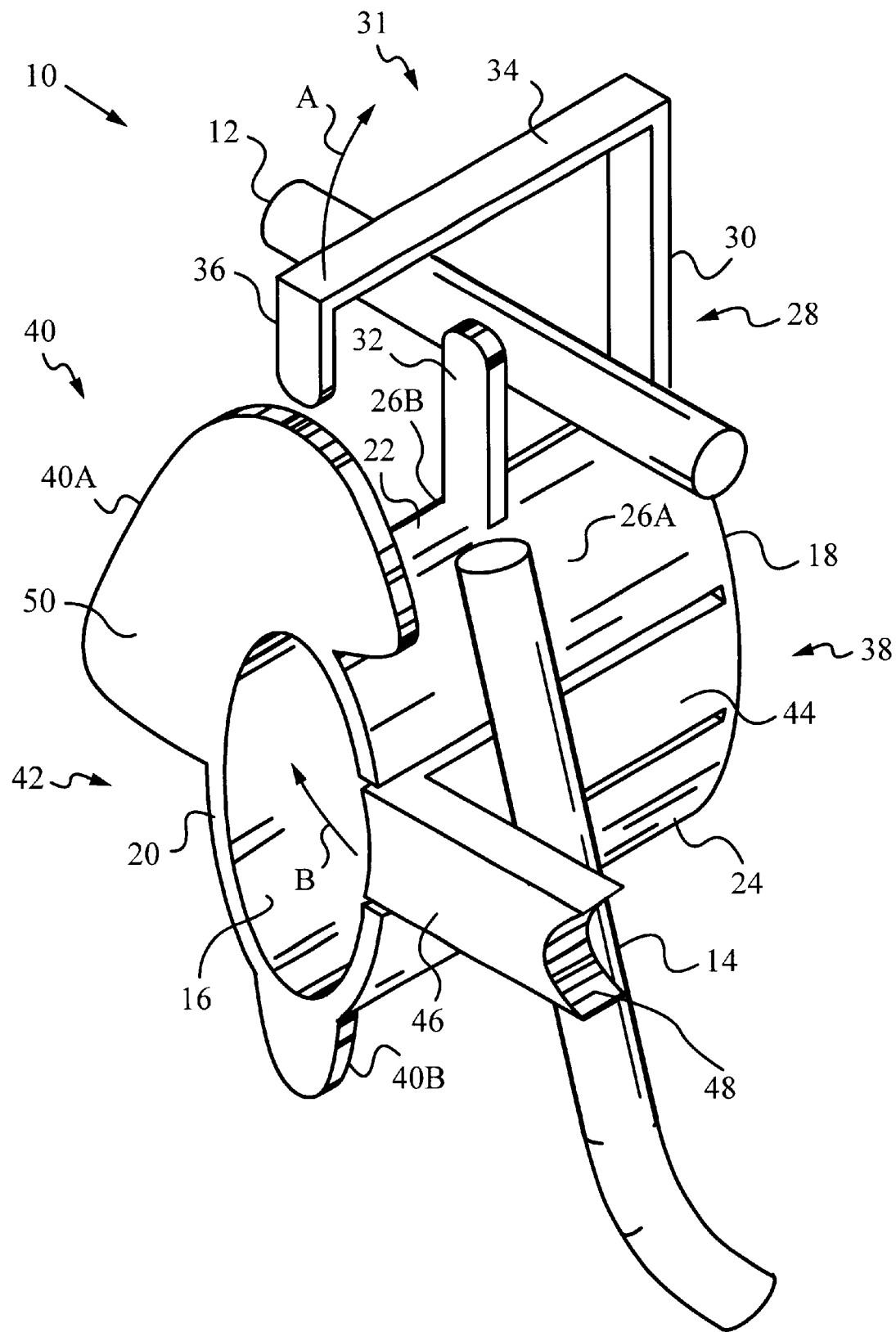
FIG. 1 is an isometric view of a cable retainer according to the invention.

FIG. 1 illustrates an advantageous embodiment of a cable retainer 10 for arranging and routing two types of cables. For clarity, only a cable section 12 of a first cable type, in this case an electrical cable such as a shielded copper wire, is shown. Likewise, only a cable section 14 of a second cable type, such as a jacketed optical fiber, is shown for the same reason.

Cable retainer 10 has a shaft 16. The cross section of shaft 16 is oval in this figure, but the eccentricity of the cross section may vary between circular to oval since these shapes have minimum radiuses of curvature above kinking points of optical fibers. A more complex cross section is also possible, but in any case it is preferable that it not have edges. Shaft 16 has a back 18, a front 20, a top 22, a bottom 24 and two sides 26A, 26B of which the right side 26A is visible in FIG. 1. Preferably, cable retainer is made of a chemically inert plastic, such as nylon. This type of plastic will prevent leaching of the PVC typically contained in the jacket of fiber optic cable 14 due to contact with shaft 16. Of course, a person skilled in the art will recognize that only portions of shaft 16 which come in contact with cable 14 have to be made of such chemically resistant plastic.

Cable retainer 10 has a top retention region 28 extending along top 22 of shaft 16. Top retention region 28 is limited at one end by a flexible top tab 30 attached at top 22 and back 18 of shaft 16. At its other end, top retention region 28 is limited by a stop 32 attached at top 22 of shaft 16. Together, stop 32 and top tab 30 form a first retention mechanism 31 for restraining cables 12 within top retention region 28.

In this embodiment stop 32 is located approximately half-way between back 18 and front 20 of shaft 16. The position of stop 32 can vary depending on the number and cross section of cables 12 of the first type to be held in top retention region 28.

The shape of stop 32 can also vary as can its point of attachment to shaft 16, but it is important that it be dimensioned to restrain any cables 12 located within retention region 28.

Top tab 30 has an arm 34 extending to front 20 of shaft 16 and overarching stop 32. Arm 34 terminates in a catch 36, bent towards shaft 16. Arm 34 is flexible and can be bent upwards as indicated by arrow A. In its relaxed position, arm 34 defines the upper bound of top retention region 28 and prevents cables 12 from slipping out of top retention region 28.

A side retention region 38 extends along side 26A of shaft 16. Side retention region 38 admits one or more cables 14 of the second type. Side retention region 38 has a second retention mechanism 42 consisting of a flange structure or lip structure 40 and a flexible side tab 44. At front 20 of shaft 16 lip structure 40 limits the extent of side retention region 38. In this embodiment, lip structure 40 consists of a top lip 40A and a bottom lip 40B. Top lip 40A is attached to top 22 of shaft 16 at its front 20. Bottom lip 40B is attached to bottom 24 of shaft 16.

Side tab 44 is attached at back 18 of shaft 16 and extends to its front 20, where it terminates with a tab stop 46. In this embodiment side tab 44 is a released section or portion of side 26A. This released portion is attached to shaft 16 at back 18. Side tab 44 can flex such that depressing tab stop 46, either with an appropriate device or manually, forces side tab 44 to bend into the interior of shaft 16, as indicated by arrow B. A second side tab 44', which is not shown in FIG. 1, similar to side tap 44 can be attached along side 26B of shaft 16 (see FIG. 2B).

When side tab 44 is in the relaxed state tab stop 46 and lip structure 40 restrain cables 14 within side retention region 38. For this reason, tab stop 46 and top lip 40A are sufficiently high and of suitable shape and rigidity to prevent cables 14 from slipping off shaft 16 once these are lodged in side retention region 38. A person skilled in the art will recognize that top lip 40A can have various shapes to fulfill this purpose. In fact, the shape of tab stop 46 and top lip 40A can be coordinated to achieve the restraining function.

Figure 4:
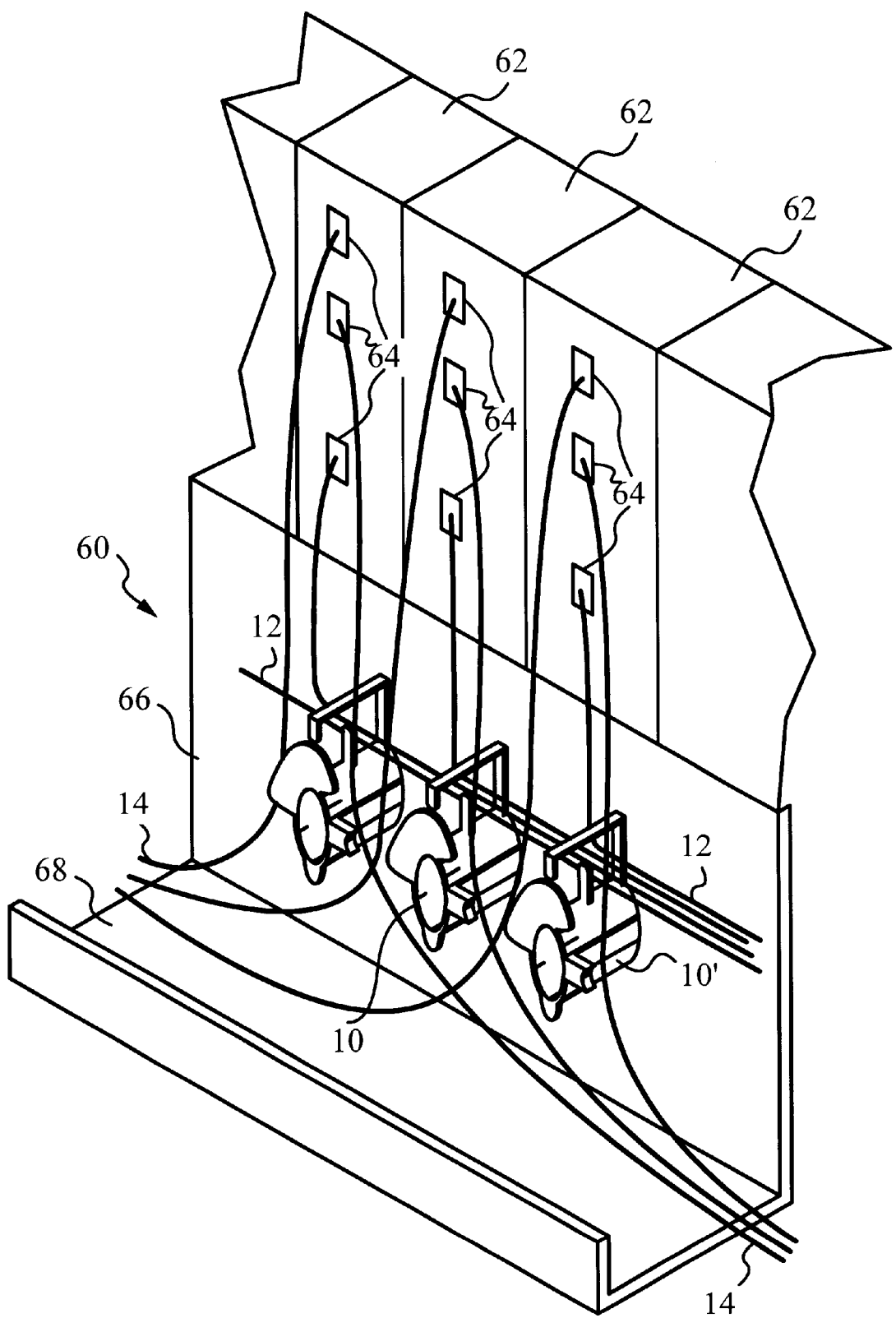
FIG. 4 is an isometric view of a cable organizer employing cable retainers according to the invention.
Figure 5A:
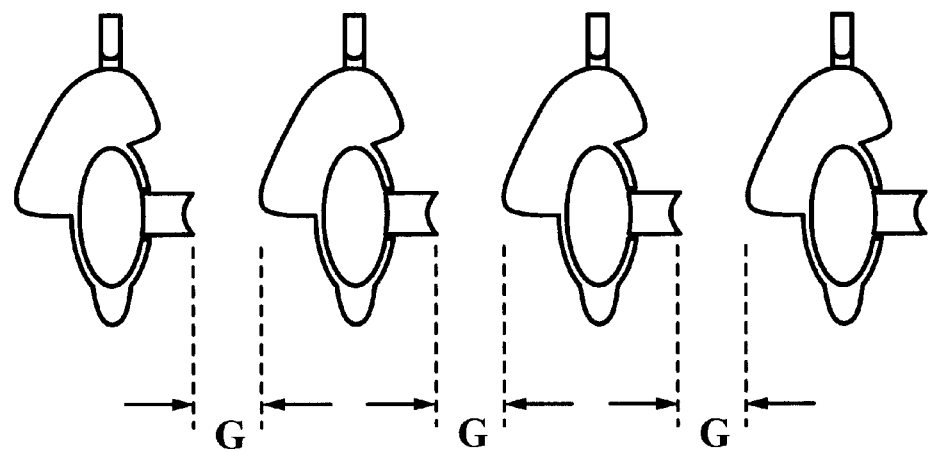
FIG. 5A is a front view illustrating gaps between adjacent mounted cable retainers of FIG. 4 according to the invention.

Bottom lip 40B aids in restraining cables 14 when these run along bottom 24, e.g., when multiple cable retainers 10 are used next to each other or when cables 14 are looped around bottom 24 of shaft 16 (see FIGS. 4, 5A&B). For this reason, it is advantageous that bottom 24, and side taps 44, 44' have a sufficiently high radius of curvature or at least be devoid of edges to prevent excessive bending, i.e., beyond the minimum or critical radius of curvature, or even kinking of cables 14.

In the present embodiment tab stop 46 has an actuation feature 48, here a recessed portion for manual actuation of side tab 44. Feature 48 is designed to simplify depressing tab stop 46 with one finger and not interfere with the restraining function when side tab 44 is in the relaxed state. Also, feature 48 is designed not to interfere with the placement of cables 14 in side retention region 38, as described below. A person of average skill in the art will appreciate that various types of actuation features can be used, depending on how the user intends to depress or bend side tab 44 (e.g., manually or with the aid of a depressing finger or other similar device) when placing cables 14 into side retention region 38.

Top lip 40A has a laterally extending portion 50. The purpose of portion 50 is to help restrain cables 14 within a side retention region of an adjacent cable retainer, e.g., a retainer similar to retainer 10 and placed in front of retainer 10 (see FIG. 4). The necessary dimensions of portion 50 to enable this functionality are discussed below.

It should be noted that in the present embodiment side retention region 38 and top retention region 28 partially overlap in the back portion of shaft 16. In fact, the position of stop 32 determines the extent of this overlap. Because of this overlap, cables 12 delimit the range of motion of cables 14. Hence, in the present embodiment no additional control features or stops are necessary to restrain cables 14 within side retention region 38 as long as cables 12 are in place in top retention region 28. Of course, as a person skilled in the art will recognize, additional features to bound side retention region 28 at back 18 or at some other location along side 26A of shaft 16 can be provided in alternative embodiments as necessary.

Figure 2A:
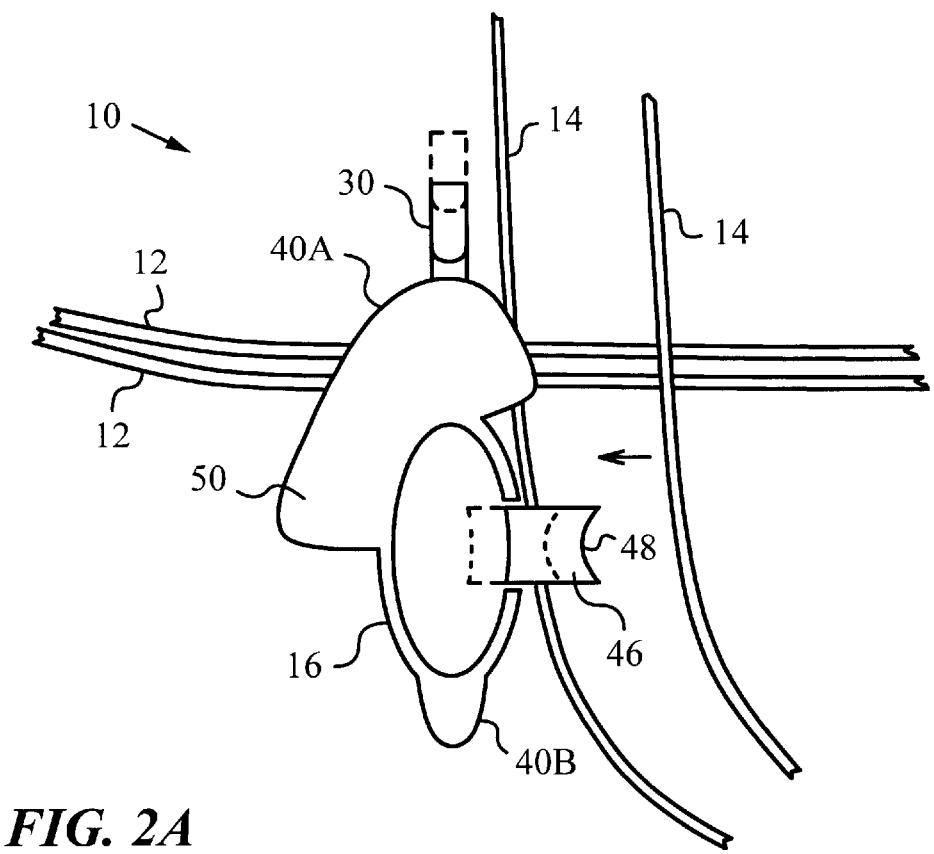
FIG. 2A is a front plan view of the cable retainer of FIG. 1 retaining two types of cables.

Cable retainer 10 is operated by first loading and arranging cables 12 of the first type. For that purpose arm 34 of top tab 30 is bent with the aid of an appropriate device or manually, e.g., by pressing catch 36. Referring to the front plan view of FIG. 2A arm 34 is indicated in an upwards bent position in dashed lines. Two cables 12 are already lodged in top retention region 28. Once all cables 12 are loaded in top retention region 28, top tab 30 is released and allowed to return to its relaxed position indicated in solid line.

Next, cables 14 of the second type are loaded and arranged in both sides of the shaft 16. For that purpose side tabs 44 is bent by pressing on feature 48. The plan view of FIG. 2 indicates side tabs 44 in an inwards bent positions in dashed lines. One cable 14 is already placed in side retention region 38 and a second cable 14 is being added, as better visualized in the side plan view of side 26A of FIG. 3. Due to the overlapping between top retention region 28 and side retention region 38 cables 12 lodged in top retention region 28 serve as a stop for cables 14. Once all cables 14 are loaded in side retention region 38, side tab 44 is released and allowed to return to their relaxed positions indicated in solid line.

Figure 2B:
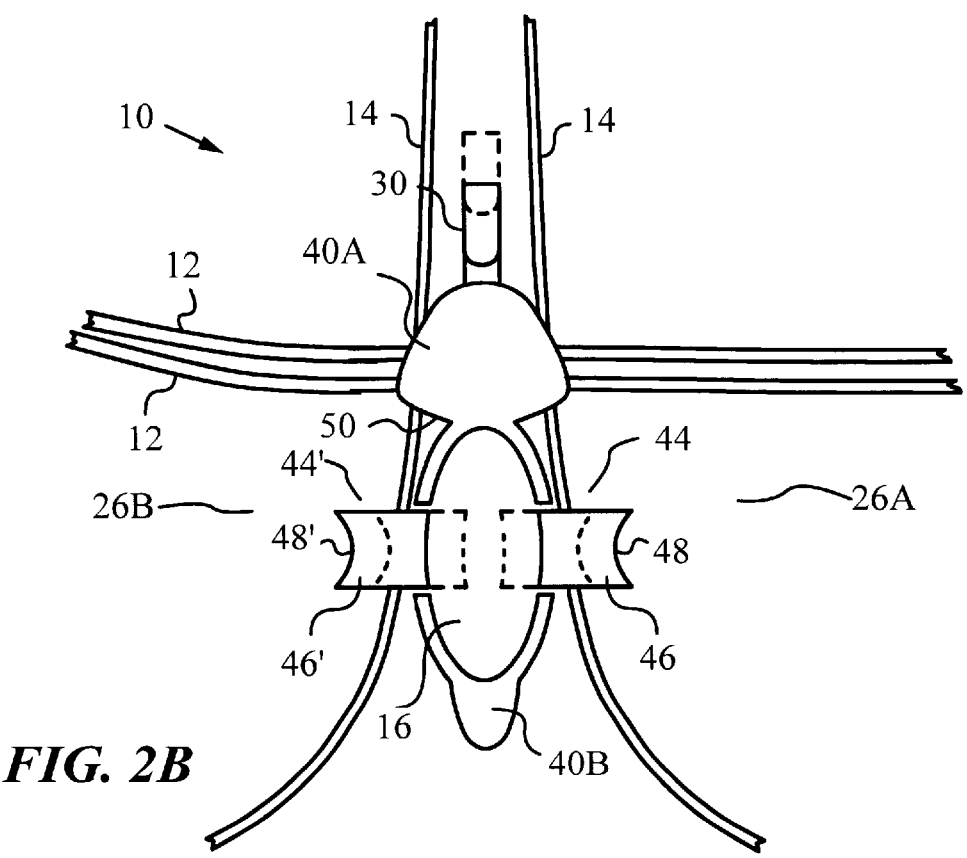
FIG. 2B is a front plan view of a cable retainer having side tabs attached on both sides of the shaft according to the invention.
Figure 3:
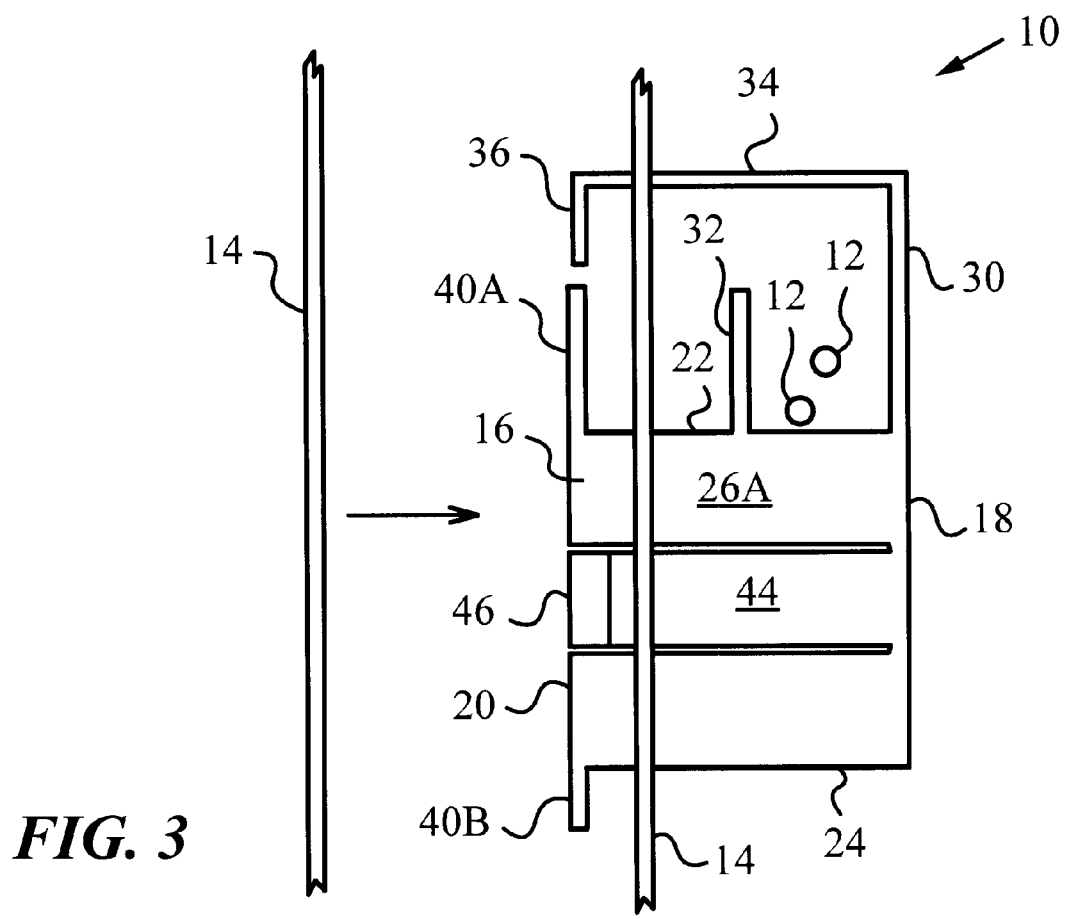
FIG. 3 is a side plan view of the cable retainer of FIG. 1 retaining two types of cables.

FIG. 2B shows a front plan view of a cable retainer 10 having side tabs 44 and 44' present on both sides 26A and 26B of shaft 16 as indicated above. Similar to side tab 44, side tab 44' is bent by pressing on feature 48' of the tab stop 46'. This cable retainer allows cables 14 mounted on both sides of shaft 16.

In an alternative embodiment, cable retainer 10 can be used for arranging and routing only one type of cable, such as optical fiber cable. Optical fibers are run through both of cable sections 12 and 14. In this case, portions of shaft 16 which come in contact with both of cable sections 12 and 14 have to be made of chemical resistant plastic.

FIG. 4 shows how cable retainer 10 is used with a cable organizer 60. In fact, a number of cable retainers 10 are employed by cable organizer 60 to arrange and route a number of cables 12 of the first type and cables 14 of the second type to modules 62 located above cable organizer 60. The same reference numerals are used as in FIGS. 1–3 to designate corresponding parts.

Top retention regions 28 of cable retainers 10 hold a number of cables 12 of the first type, in this case power cables. During arrangement and routing power cables 12 are lodged in top retention regions 28. Power cables 12 can then be plugged in at the appropriate plug-in terminals 64 of modules 62.

Next, cables 14 of the second type, in this case optical fibers, are placed and arranged in the corresponding side retention regions 38 of cable retainers 10. It should be noted that once cables 12 are lodged, laterally extending portions 50 of top lips 40A cooperate with tab stops 46 of adjacent cable retainers to restrain cables 14 within side retention regions 38. This functionality can be ensured by mounting cable retainers 10 in a predetermined pattern.

In this embodiment cable retainers 10 are mounted by backs 18 on a side wall 66 of cable organizer 60 in a straight line pattern. A panel 68 extends from the side wall 66 of the cable organizer 60 as shown in FIG. 4. Thus, when side tab 44 of one cable retainer 10 is depressed, cable 14 has enough room between laterally extending portion 50' of top lip 40A' of an adjacent cable retainer 10' on its right side to slip into side retention region 28 of the one cable retainer 10. Once side tab 44 is released, cable 14 is securely lodged in side retention region 28 and its movement to back 18 is limited by the previously arranged and routed cables 12.

FIG. 5A illustrates the gaps G between adjacent cable retainers of the cable organizer 60 described in FIG. 4. Gaps G must be less than cable diameters to prevent cables 14 from slipping off cable retainer 10.

Figure 5B:
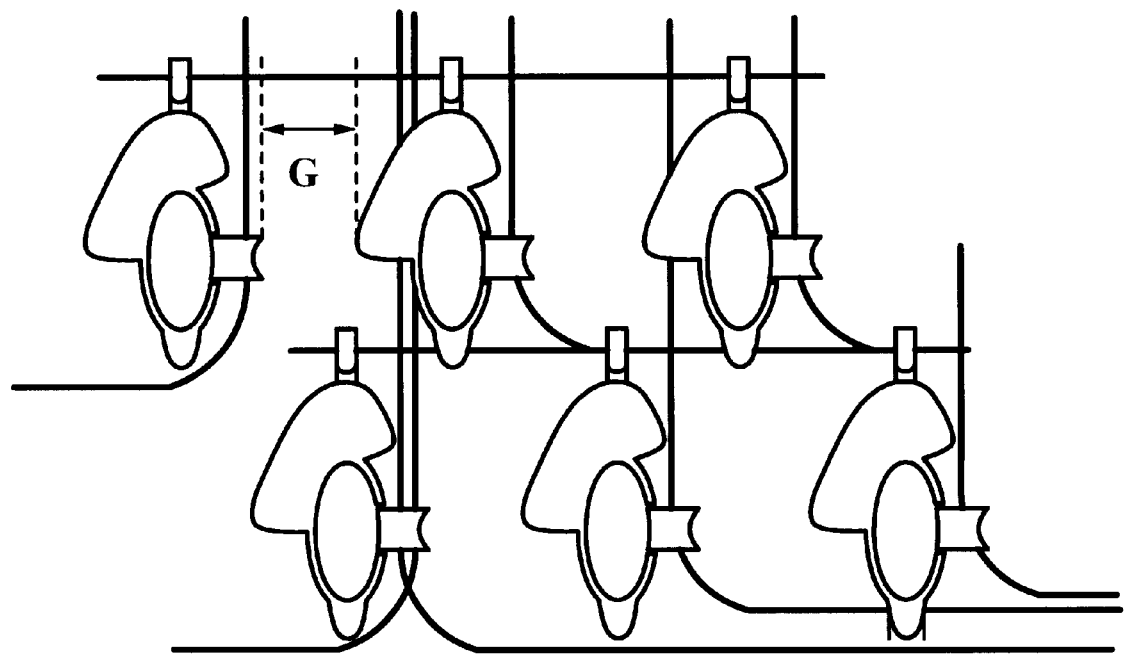
FIG. 5B is a front view illustrating another pattern for mounting cable retainers according to the invention.

FIG. 5B illustrates an alternative pattern of mounting cable retainers 10. It will be appreciated by a person skilled in the art to mount cable retainers in different patterns and arrange the cables in different directions.

It will also be clear that the cable retainer can also be used for more cable types than just two. For example, different cable types can be mixed in same retention regions or additional retention regions can be produced. For example, the top of the shaft of a cable retainer can have numerous stops to define many retention regions along the top of the shaft. Likewise, numerous retention regions can be accommodated along one or both sides of the cable retainer.

It will be clear to one skilled in the art that the above embodiments may be altered in many ways without departing from the scope of the invention. Accordingly, the following claims and their legal equivalents should determine the scope of the invention.

What is claimed is:

1. A cable retainer comprising:
    a) a shaft having a top, a bottom, a front, a back, sides, a top retention region extending along said top for admitting at least one first cable and at least one side retention region extending along one of said sides for admitting at least one second cable;
    b) a first retention mechanism attached to said shaft for restraining said at least first cable within said top retention region; and
    c) a second retention mechanism attached to said shaft for restraining said at least one second cable within said at least one side retention region;

wherein said first retention mechanism comprises a stop attached at said top and a flexible top tab attached at said back, such that said top retention region extends along said top from said back to said stop.

2. The cable retainer of claim 1, wherein said at least one first cable and said at least one second cable are of the same type.

3. The cable retainer of claim 2, wherein said at least one first cable and said at least one second cable comprise fiber optic cables.

4. The cable retainer of claim 1, wherein said at least one first cable and said at least one second cable are of different types.

5. The cable retainer of claim 4, wherein said at least one first cable comprises at least one electrical cable and said at least second cable comprises at least one fiber optic cable.

6. The cable retainer of claim 1, wherein said top tab overarches said top.

7. The cable retainer of claim 1, wherein said top tab extends to said front.

8. A cable retainer comprising:
   a) a shaft having a top, a bottom, a front, a back, sides, a top retention region extending along said top for admitting at least one first cable and at least one side retention region extending along one of said sides for admitting at least one second cable;
   b) a first retention mechanism attached to said shaft for restraining said at least first cable within said top retention region; and
   c) a second retention mechanism attached to said shaft for restraining said at least one second cable within said at least one side retention region;
   wherein said second retention mechanism comprises a lip structure attached to said front and at least one flexible side tab extending along said one side to said front.

9. The cable retainer of claim 8, wherein said lip structure comprises a top lip attached to said top and a bottom lip attached to said bottom.

10. The cable retainer of claim 8, wherein said at least one side tab forms a portion of said one side.

11. The cable retainer of claim 10, wherein said at least one side tab further comprises a tab stop at said front.

12. The cable retainer of claim 11, wherein said tab stop comprises an actuation feature.

13. The cable retainer of claim 8, wherein said at least one side tab is attached to said back.

14. The cable retainer of claim 8, wherein said top lip has a laterally extending portion.

15. The cable retainer of claim 1, wherein said shaft has an oval cross-section.

16. The cable retainer of claim 1, wherein said top retention region and said at least one side retention region are partially overlapping such that said at least one first cable delimits the range of motion of said at least one second cable.

17. The cable retainer of claim 1, wherein at least a portion of said cable retainer is made of a chemically resistant plastic.

* * * * *